United States Patent [19]
Inoue

[11] 3,999,196
[45] Dec. 21, 1976

[54] PHOTOGRAPHIC CAMERA

[75] Inventor: Nobuyoshi Inoue, Kawagoe, Japan

[73] Assignee: Copal Company Limited, Tokyo, Japan

[22] Filed: Mar. 27, 1975

[21] Appl. No.: 562,424

[30] Foreign Application Priority Data
Mar. 30, 1974 Japan .............................. 49-36394

[52] U.S. Cl. .............................. 354/154; 354/152; 354/155; 354/225; 354/242; 354/246; 354/249

[51] Int. Cl.[2] .................. G03B 19/12; G03B 13/08; G03B 9/38

[58] Field of Search .......... 354/152, 154, 155, 156, 354/241, 242, 245, 246, 248, 249, 224, 225

[56] References Cited
UNITED STATES PATENTS
2,949,073   8/1960   Weiss ................................. 354/155

FOREIGN PATENTS OR APPLICATIONS
1,285,862   12/1968   Germany .......................... 354/154

Primary Examiner—Russell E. Adams, Jr.
Attorney, Agent, or Firm—Cushman, Darby & Cushman

[57] ABSTRACT

A photographic camera provided with a focal plane shutter having a plurality of vertically-movable shutter blades, in which at least a part of the leading-shutter blade consisting of a plurality of thin plates is positioned, in order to reduce the height of the camera as a whole, into the optical path of the view finder optical system of the camera when the leading-shutter blade has been brought into its opening position where it opens the exposure aperture in response to the shutter release.

4 Claims, 12 Drawing Figures

FIG. IA PRIOR ART
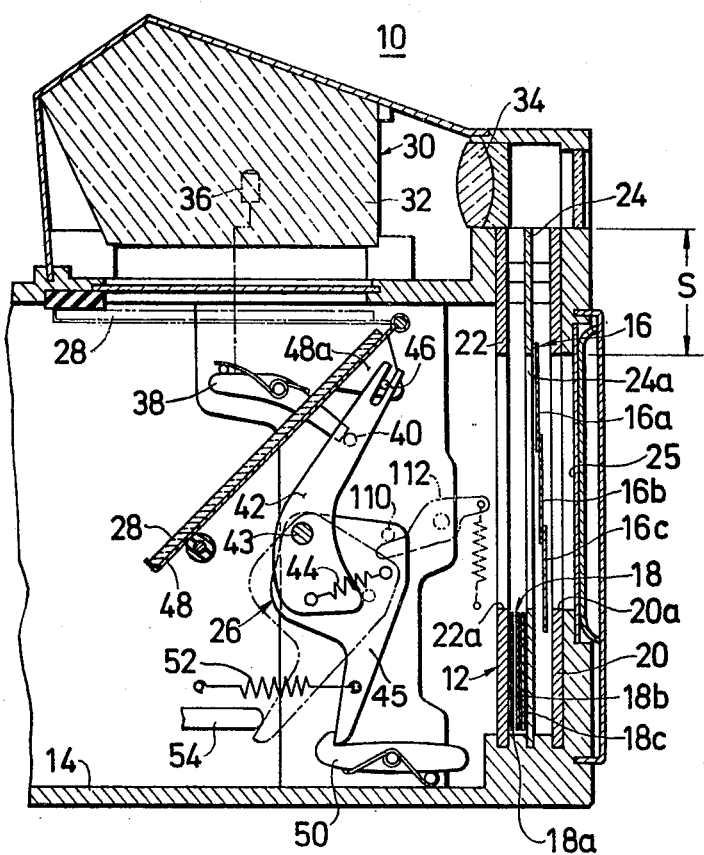
FIG. IB PRIOR ART
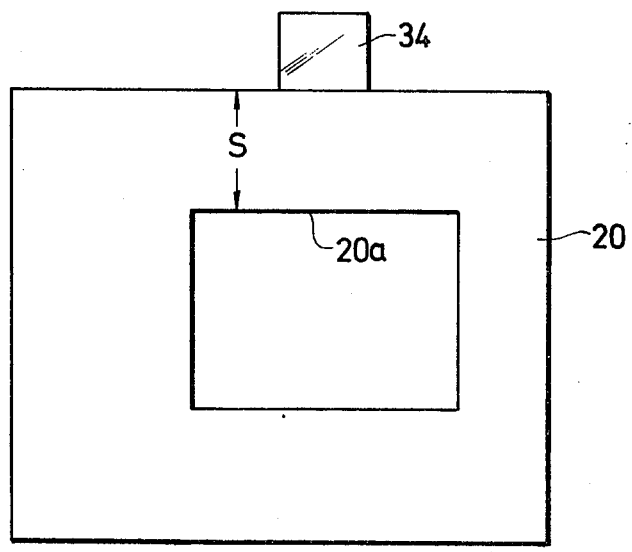

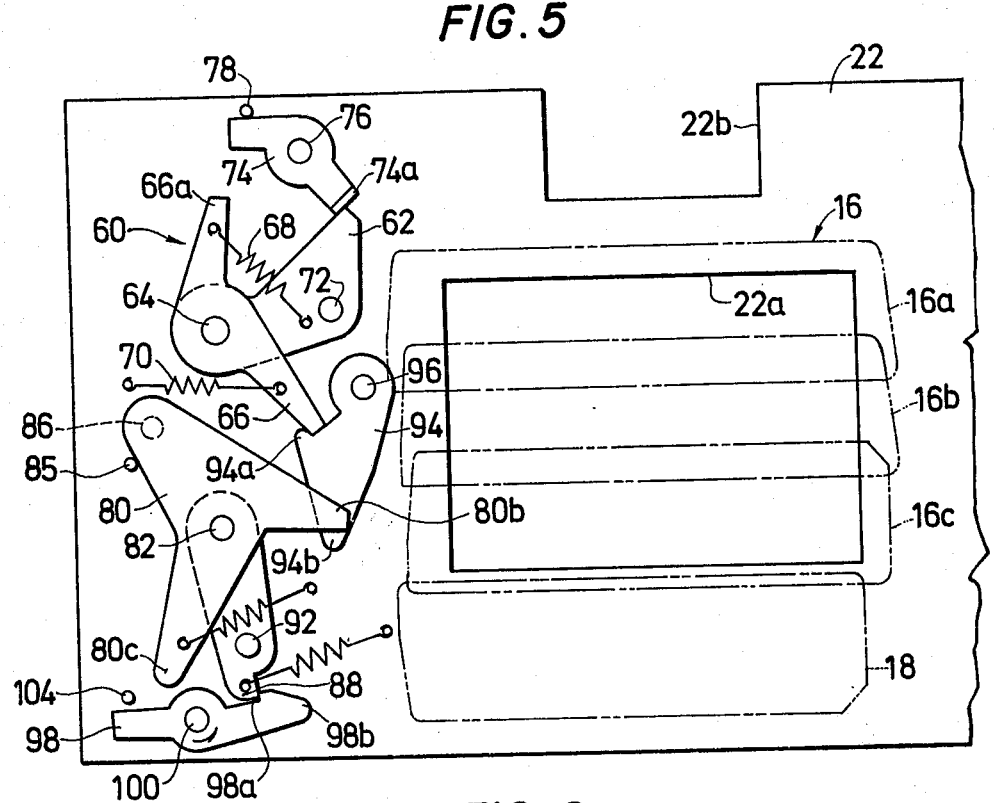
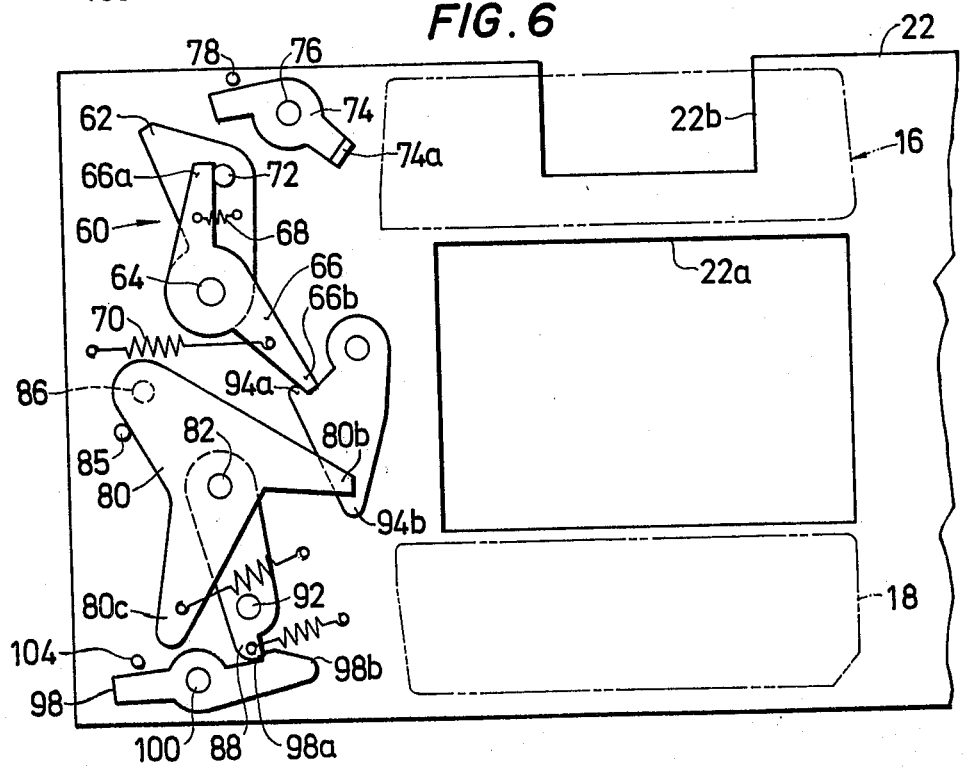

PHOTOGRAPHIC CAMERA

BACKGROUND OF THE INVENTION

1. Field of the Invention

The present invention relates to a photographic camera provided with a focal plane shutter having a plurality of vertically-movable shutter blades.

2. Description of the Prior Art

As shown in FIGS. 1A and 1B, a photographic camera such as a single lens reflex camera 10 provided with a focal plane shutter 12 having a plurality of vertically-movable shutter blades at the rear portion of the camera body 14 is known in the art. The focal plane shutter 12 of this type comprises a leading-shutter blade 16 which consists of a plurality of thin metal plates 16a, 16b and 16c and a trailing-shutter blade 18 which also consists of a plurality of thin metal plates 18a, 18b and 18c similar to those of the leading-shutter blades 16. The leading-shutter blade 16 is movably mounted on the first shutter base plate 20 having an exposure aperture 20a so that the leading-shutter blade 16 can move between its closing position where it covers the exposure aperture 20a and its opening position where it opens the exposure aperture 20a. Similarly, the trailing-shutter blade 18 is movably mounted on the second shutter base plate 22 having an exposure aperture 22a aligned with the exposure aperture 20a so that the trailing-shutter blade 18 can move between its closing position where it covers the exposure aperture 22a and its opening position where it opens the exposure aperture 22a. Between the leading and the trailing-shutter blades 16 and 18, there is provided a partition plate 24 having an exposure aperture 24a aligned with the apertures 20a and 22a. In FIG. 1A, both of the leading and the trailing-shutter blades 16 and 18 are shown schematically in somewhat exaggerated manner with their drive mechanisms removed, in order to avoid the complexity of the drawing and to indicate only the existing positions of the shutter blades 16 and 18 in the shutter cocked condition. While the detail arrangement of the shutter 12 is not shown in FIG. 1A for the abovementioned reasons, the detail construction of such focal plane shutter having a plurality of vertically-movable shutter blades as shown in FIG. 1A is disclosed in detail in my co-pending U.S. patent application Ser. No. 501,617 filed on Aug. 29, 1974.

In the shutter rest condition, both of the leading and the trailing-shutter blades 16 and 18 are positioned in their closing positions. When the shutter 12 is charged or cocked interlockingly with the film take-up operation, the trailing-shutter blade 18 is moved in the transverse direction across the feed direction of a film 25 i.e. in the vertical direction and finally positioned beneath the apertures 20a, 24a and 22a, namely in the opening position, with its thin plates 18a, 18b and 18c collapsed each other.

On the other hand, in the camera body 14, mirror operating mechanism 26 is provided for operating a movably supported reflex mirror 28 which constitutes a part of a view finder reflex system generally indicated by the reference 30 together with a pentagonal prism 32 and a view finder lens 34. The reflex mirror 28 and the mirror operating mechanism 26 are in the position shown in FIG. 1A after the shutter 12 has been cocked.

When a shutter release button 36, shown schematically by the dotted line in FIG. 1A, is depressed, a lock lever 38 is turned in the counterclockwise direction and disengaged from a pin 40 fixed to an actuating lever 42 which is rotatably supported by a shaft 43. Accordingly, the actuating lever 42 is moved in the counterclockwise direction by a spring 44 provided between the one end of the actuating lever 42 and set lever 45 which is also rotatably supported by the shaft 43. Since the other end of the actuating lever 42 is furcated and a pin 46 fixed to a bent portion 48a of a pivotally movable mirror support member 48 is positioned between the furcation, the mirror 28 is moved in the clockwise direction together with the mirror support member 48 in accordance with the counterclockwise movement of the actuating lever 42 and finally positioned in the position shown in phantom in FIG. 1A. In response to the mirror 28 being positioned in the phantom position, the leading-shutter blade 16 is rapidly moved upwardly by a shutter drive mechanism not shown in FIG. 1A and is positioned above the apertures 20a, 24a and 22a, namely in the opening position, with its thin plates 16a, 16b and 16c collapsed each other. In this way, the exposure for the film (not shown) is begun. Subsequent to the beginning of the exposure, the trailing-shutter blade 18 is released from its opening position by the well-known timing mechanism (not shown) after a certain time delay, moved rapidly and upwardly by the shutter drive mechanism and positioned in its closing position for terminating the exposure. The leading-shutter blade 16 returns to its closing position from its opening position in response to the trailing-shutter blade 18 being brought into its closing position. At the same time, in response to the leading-shutter blade 16 returning to its closing position, a lock lever 50 is moved in the counterclockwise direction by a suitable link mechanism (not shown) for releasing the set lever 45 from the position shown in FIG. 1A. Accordingly, the set lever 45 is moved in the clockwise direction, together with the actuating lever 42, by a spring 52 and the mirror 28 returns to the position shown by the solid line in FIG. 1A.

In this way, the whole mechanisms of the camera 10 will be in the rest condition. From this rest condition, if the shutter 12 is charged interlockingly with the film take-up operation the trailing-shutter blade 18 is positioned in its opening position, and, simultaneously, the set lever 45 is moved counterclockwise direction against the spring 52 by means of the rightward movement of the lever 54 which is moved interlockingly with the film take-up operation until the set lever 45 is locked by the rock lever 50. Therefore, the stand-by condition for photographing is obtained.

In such conventional camera 10 as described heretofore, a sufficient space S is provided at the upper portion of the first shutter base plate 20 and the partition plate 24 for the purpose of completely hiding the collapsed thin plates 16a, 16b and 16c of the leading-shutter blade 16 and the optical path from the pentagonal prism 32 to the view finder lens 34 in the view finder optical system 30 is positioned above the first shutter base plate 20 so as not to be obstructed by the thin plates 16a, 16b and 16c of the leading-shutter blade 16. As a result of these arrangements described above, the conventional photographic camera provided with the focal plane shutter having a plurality of vertically-movable shutter blades has a drawback in which the height of the camera as a whole can not help being higher than that of the camera provided with a focal plane shutter having a pair of horizontally-movable curtains, that is, the volume of the camera which is originally required to be compact is much larger than that of the above-mentioned camera having the horizontally-movable curtain type shutter.

SUMMARY OF THE INVENTION

Therefore, the principal object of the present invention is to provide the photographic camera provided with the focal plane shutter having a plurality of vertically-movable shutter blades, which is compact in volume and low in height.

Another object of the present invention is to provide a photographic camera provided with the focal plane shutter having a plurality of vertically-movable shutter blades, which is made compact without reducing the volume or size of the shutter.

Further object of the present invention is to provide the focal plane shutter capable of realizing a small sized photographic camera.

According to the present invention, the foregoing objects can be attained by positioning at least a part of the leading-shutter blade which is held in its closing position where it covers the exposure aperture when the shutter is in a charged condition, into the optical path of the view finder optical system of the camera when the leading-shutter blade has been brought into its opening position where it opens the exposure aperture in response to the shutter release.

BRIEF DESCRIPTION OF THE DRAWINGS

Other object and features of the invention will become apparent to those skilled in the art as the disclosure made in the following description with the accompanying drawings, in which like reference characters designate the same or similar parts throughout the figure thereof and wherein, FIG. 1A shows schematically a side elevational, sectional view of the main part of a conventional single lens reflex camera provided with a focal plane shutter having a plurality of vertically-movable shutter blades with the drive mechanism of the shutter removed for the purpose of the clarity of the drawing, FIG. 1B shows an explanatory plan view of the shutter base plate and the view finder lens of the conventional camera shown in FIG. 1A, showing the relative positions thereof.

DETAILED DESCRIPTION OF THE PREFERRED EMBODIMENTS

Figure 2A:
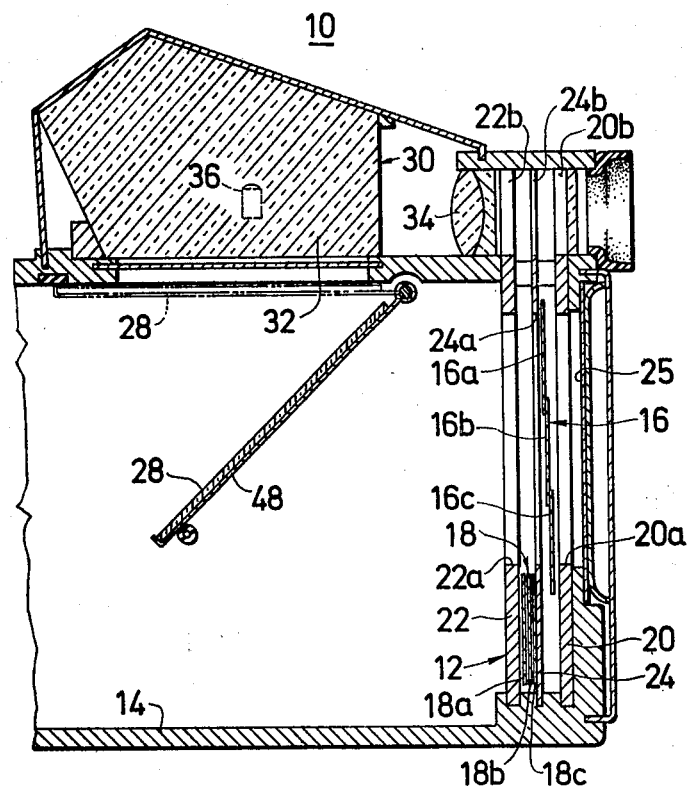
FIG. 2A shows schematically a side elevational, sectional view of the main part of a single lens reflex camera, according to the present invention, provided with a focal plane shutter having a plurality of vertically-movable shutter blades with the drive mechanism of the shutter and the mirror operating mechanism removed for the clarity of the drawing.
Figure 2B:
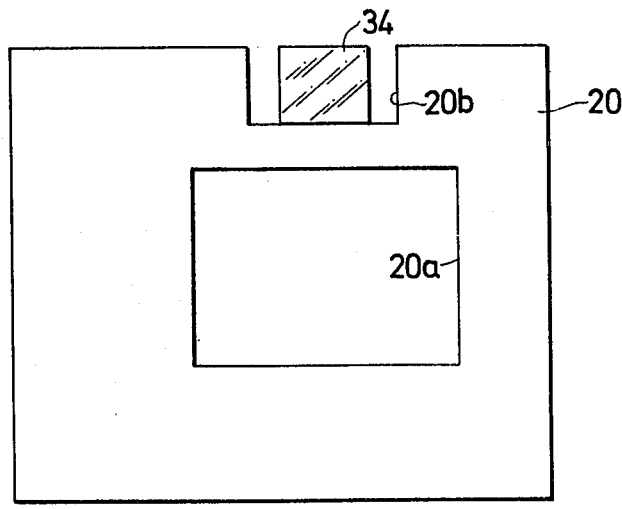
FIG. 2B shows an explanatory plan view of the shutter base plate and the view finder lens of the camera shown in FIG. 2A, showing the relative positions thereof, FIGS. 3 through 6 respectively show plan views of the drive mechanism, in different positions, of the shutter used in the camera shown in FIG. 2A, FIGS. 7 through 9 schematically show the side elevational, sectional views of the shutter with its drive mechanism removed and the view finder lens of the photographic camera according to the present invention, showing respectively the positions of the leading and the trailing-shutter blades in the different conditions of the shutter.

Referring now to FIG. 2A, a photographic camera 10 of a single lens reflex type according to the present invention provides with a focal plane shutter 12 having a plurality of vertically-movable shutter blades having the same construction as that of the conventional photographic camera 10 shown in FIG. 1A except that a first and a second shutter base plates 20 and 22 and a partition plate 24 have at their upper portions cutout portions 20b, 22b and 24b, which are aligned with each other, in addition to exposure apertures 20a, 22a and 24a. The shutter is built in at the rear portion of the camera body 14 so that the optical path of a view finder optical system 30 can pass through the cutout portions 20b, 22b and 24b of the first and the second shutter base plates 20 and 22 and the partition plate 24. A leading-shutter blade 16 consisting of a plurality of thin metal plates 16a, 16b and 16c and a trailing-shutter blade 18 consisting of a plurality of similar thin metal plates 18a, 18b and 18c are movably mounted to the first and the second shutter base plates 20 and 22 so that they can move between their closing position where they cover the aperture 20a or 22a and their opening position where they open the aperture 20a or 22a. When the leading-shutter blade 16 is brought into its opening position, the blade 16 is held above the exposure apertures 20a, 22b and 24b. According to the present invention, therefore, a part of the leading-shutter blade 16 is positioned into the optical path of the view finder optical system 30 of the camera 10 when the blade 16 is brought into its opening position. While the detail construction of the shutter 12 is not shown in FIG. 2A, a focal plane shutter having a plurality of vertically-movable shutter blades, for example, described in my afore-mentioned co-pending U.S. patent application Ser. No. 501,617 is applicable as the shutter 12 to the photographic camera 10 of the present invention.

The sequential operations of the leading and the trailing-shutter blades 16 and 18 are performed by a shutter drive mechanism 60 shown in FIGS. 3 through 6. In these Figures, numeral 62 designates a drive lever for driving the leading-shutter blade 16, which is pivotably supported by the shaft 64 fixed to the second shutter base plate 22. Numeral 66 designates an intermediate lever having arms 66a and 66b, which is also pivotably supported by the shaft 64. Between one arm 66a of the intermediate lever 66 and the drive lever 62, a drive spring 68 for driving the leading-shutter blade 16 is provided and another spring 70 is provided between other arm 66b of the intermediate lever 66 and the shutter base plate 22 so as to impart the rotary force in the clockwise direction to the intermediate lever 66. Numeral 72 designates a stopper pin which is fixed to the drive lever 62 so that one arm 66a of the intermediate lever 66 may be engaged therewith.

The leading-shutter blade 16 is moved between its closing position and its opening position by the reciprocating movement of the drive lever 62 within a predetermined range of an angle. Numeral 74 designates a release lever for releasing the leading-shutter blade 16, which is pivotably supported by a shaft 76 fixed to the shutter base plate 22. The release lever 74 has an upwardly-bent portion 74a at its one end for preventing the rotation of the drive lever 62 toward the counterclockwise direction by engaging with extreme end of the drive lever 62 and is biased in the clockwise direction by a spring (not shown). Numeral 78 designates a stopper pin fixed to the shutter base plate 22 for positioning the release lever 74 at the position shown in FIG. 3 when the shutter 12 is in the rest condition. Numeral 80 designates a set lever having arms 80a, 80b and 80c, which is pivotably supported by a shaft 82 fixed to the shutter base plate 22 and is biased in the counterclockwise direction by a spring 84 provided between the arm 80c and the shutter base plate 22. Numeral 85 designates a stopper pin fixed to the shutter base plate for positioning the set lever 80 at the position shown in FIG. 3 when the shutter 12 is in the rest condition. Numeral 86 designates a pin fixed on the reverse side of the arm 80a of the set lever 80 so that it may engage with the arm 66b of the intermediate lever 66. Numeral 88 designates a drive lever for driving the trailing-shutter blade 18, which is also pivotably supported by the pin 82, and a drive spring 90 for driving the trailing-shutter blade 18 is provided between the end portion of the drive lever 88 and the shutter base plate 22. Numeral 92 designates a pin fixed to the drive lever 88 so that it may engage with the arm 80b of the set lever 80. Numeral 94 designates a lock lever pivotably supported by a shaft 96 which is fixed to the shutter base plate 22. The lock lever 94 has a hook portion 94a which can lock the extreme end of the arm 66b of the intermediate lever 66, and an inclined portion 94b engageable with the pin 92 fixed to the drive lever 88. Similar to the release lever 74, the lock lever 94 is continously biased in the clockwise direction by a spring not shown in the drawing. Numeral 98 designates a release lever for releasing the trailing-shutter blade 18, which is pivotably supported by a shaft 100 fixed to the shutter base plate 22 and is biased in the counterclockwise direction by a spring (not shown). The release lever 98 has a hook portion 98a capable of locking the extreme end of the drive lever 88 and an inclined portion 98b with which the extreme end portion of the drive lever may engage. Numeral 104 designates a stopper pin fixed to the shutter base plate 22 so that it can hold the release lever 98 at the position shown in FIG. 3 when the shutter is in the rest condition.

Although each one end of the springs 70, 84 and 90 is fixed in fact to the predetermined points of the shutter base plate 22, such fixing points on the shutter base plate 22 are displaced, for convenience sake, in the different positions in FIGS. 3 through 6 in accordance with the positions of the elements of the shutter drive mechanism 60 for avoiding the complexity of the drawings.

Figure 3:
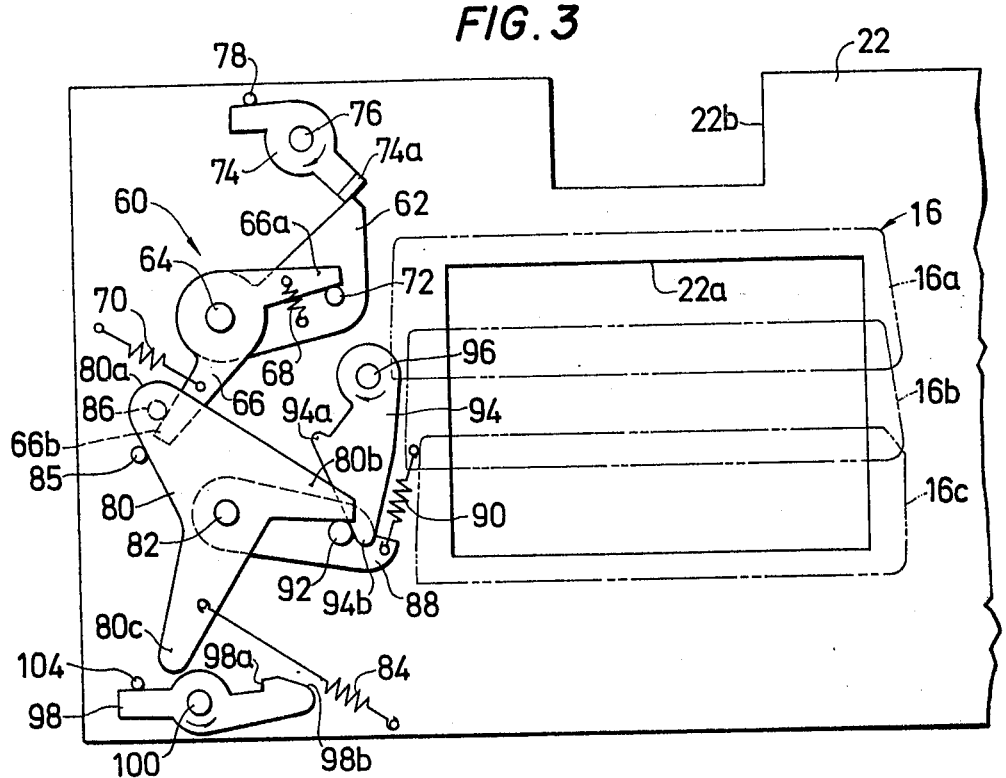
Figure 4:
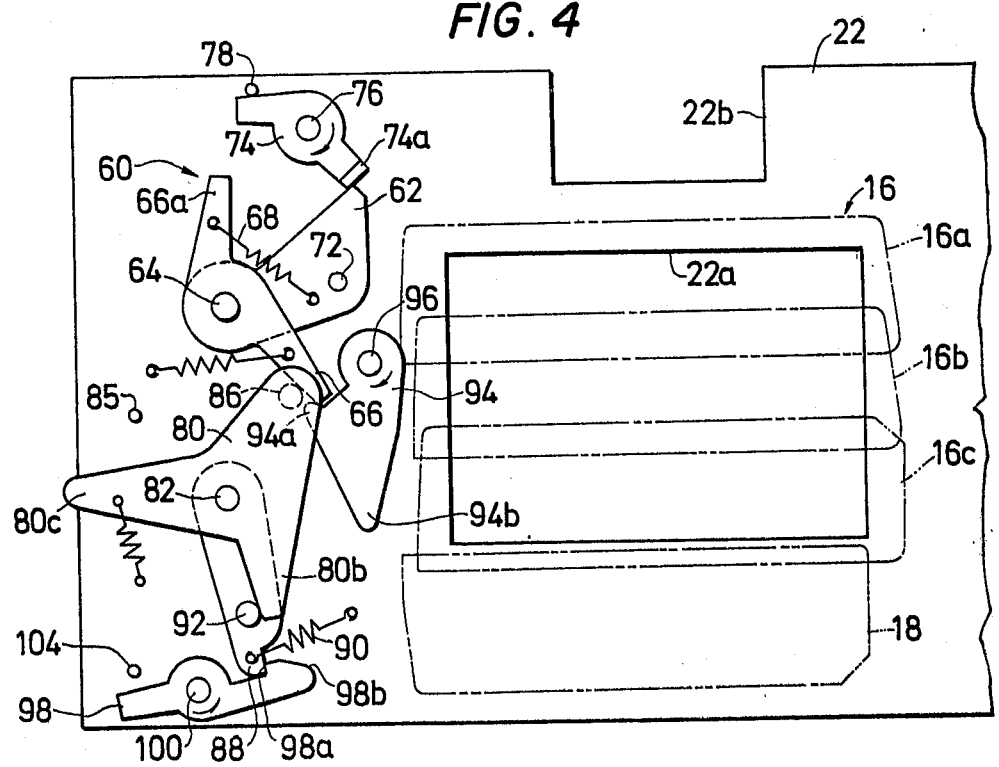
Figure 7:
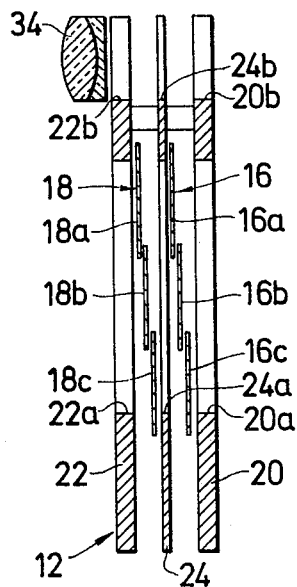
Figure 8:
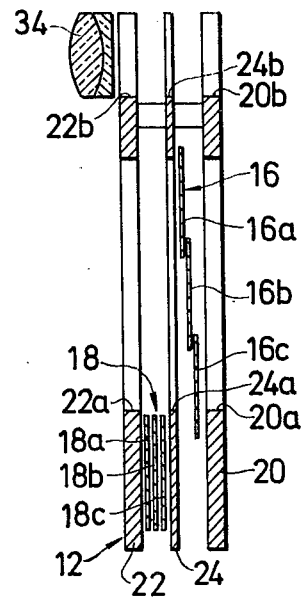

In the shutter rest condition, the shutter drive mechanism 60 is in a position shown in FIG. 3 and the leading and the trailing-shutter blades 16 and 18 are in their closing positions shown in FIG. 7. In FIG. 3, though the leading-shutter blade 16 is shown in phantom, the trailing-shutter blade 18 is not shown for the clarity of the drawing. In such shutter rest condition, if the set lever 80 is rotated in the clockwise direction against the spring 84 by, for example, the film take-up operation, the intermediate lever 66 is rotated by the pin 86 fixed to the set lever 80 in the counterclockwise direction against the spring 68 and 70 and finally the extreme end of the arm 66b of the intermediate lever 66 is locked by the hook portion 94a of the lock lever 94. At the same time, the drive lever 88 is rotated in the clockwise direction against the drive spring 90 by the arm 80b of the set lever 80 since the pin 92 fixed to the drive lever 88 is engaged with the arm 80b, and finally the extreme end of the drive lever 88 is locked by the hook portion 98a of the release lever 98. Accordingly, the shutter drive mechanism 60 is brought into the position shown in FIG. 4. On the other hand, the trailing-shutter blade 18 is moved from its closing position shown in FIG. 7 to its opening position shown in FIGS. 4 and 8 in accordance with the rotational movement of the drive lever 88 from the position shown in FIG. 3 to the position shown in FIG. 4. In this condition, if the rotational drive power to the set lever 80 is removed in response to the completion of the film take-up operation, the set lever 80 returns to its rest position shown in FIG. 3 and, therefore, the shutter drive mechanism becomes a cocked or charged condition as shown in FIG. 5, and the leading-shutter blade 16 is held in its closing position and the trailing-shutter blade 18 is held in its opening position as shown in FIGS. 5 and 8.

Figure 9:
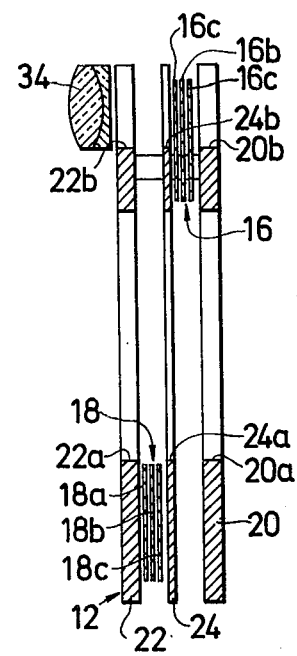

If the shutter release button 36 of the camera 10 shown in FIG. 2A is depressed after such shutter charged condition is obtained, the movable mirror 28 is first moved from the position shown by the solid line to the position shown in phantom by the mirror operating mechanism (not shown) similar to one shown in FIG. 1A and then the release lever 74 in the shutter drive mechanism 60 shown in FIG. 5 is rotated in the counterclockwise direction by a suitable link mechanism. Since the engagement between the upwardly-bent portion 74a of the release lever 74 and the drive lever 62 is released by such rotational movement of the release lever 74, the drive lever 62 is rapidly rotated by the drive spring 68 in the counterclockwise direction until the pin 72 fixed to the drive lever 62 abuts on the arm 66a of the intermediate lever 66. Therefore, the leading-shutter blade 16 is rapidly moved from its closing position shown in FIGS. 5 and 8 to its opening position shown in FIGS. 6 and 9 and the exposure on the film 25 (FIG. 2A) is begun. While the leading-shutter blade 16 is positioned into the optical path of the view finder optical system 30 (FIG. 2A) when it has been moved to its opening position as described before and, therefore, the optical path of the view finder optical system 30 is obstructed by the leading-shutter blade 16, any serious problem will not occur since the optical path of the view finder optical system has already been in a darkened condition due to the fact that the reflex mirror 28 had been held in the position shown in phantom in FIG. 2A.

Since the release lever 98 is moved, after a certain time delay from the beginning of the exposure, in the clockwise direction by a suitable link mechanism which is controlled by a well known timing mechanism (not shown), the extreme end of the drive lever 88 disengages from the hook portion 98a of the lock lever 98 and hence the drive lever 88 is rapidly moved in the counterclockwise direction by the drive spring 90. At the same time, the trailing-shutter blade 18 is moved from its opening position shown in FIGS. 4, 5, 6 and 9 to its closing position shown in FIG. 7 by the movement of the drive lever 88, so that the exposure is terminated. By the continual movement of the drive lever 88 in the counterclockwise direction, the pin 92 fixed to the drive lever 88 abuts on the inclined portion 94b of the lock lever 94 and moves the lock lever 94 in the counterclockwise direction, so that the engagement between the extreme end of the intermediate lever 66 and the lock lever 94 is released. Accordingly, the intermediate lever 66 is moved together with the drive lever 62 in the clockwise direction by means of the spring 70, and the leading-shutter blade 16 which has been held in its opening position returns to its closing position, as shown in FIGS. 2A, 3, 4 and 5, by the rotational movement of the drive lever 62. After the leading-shutter blade 16 has returned to its closing position, the reflex mirror 28 is moved to the position shown by the solid line in FIG. 2A from the position shown in phantom by means of the mirror operating mechanism (not shown) similar to one shown in FIG. 1A.

Therefore, the shutter drive mechanism 60 is returned to its rest position as shown in FIG. 3 and the leading and the trailing-shutter blades 16 and 18 are returned to their closing position for making preparations for the next exposure simultaneously with the completion of one exposure.

Figure 10:
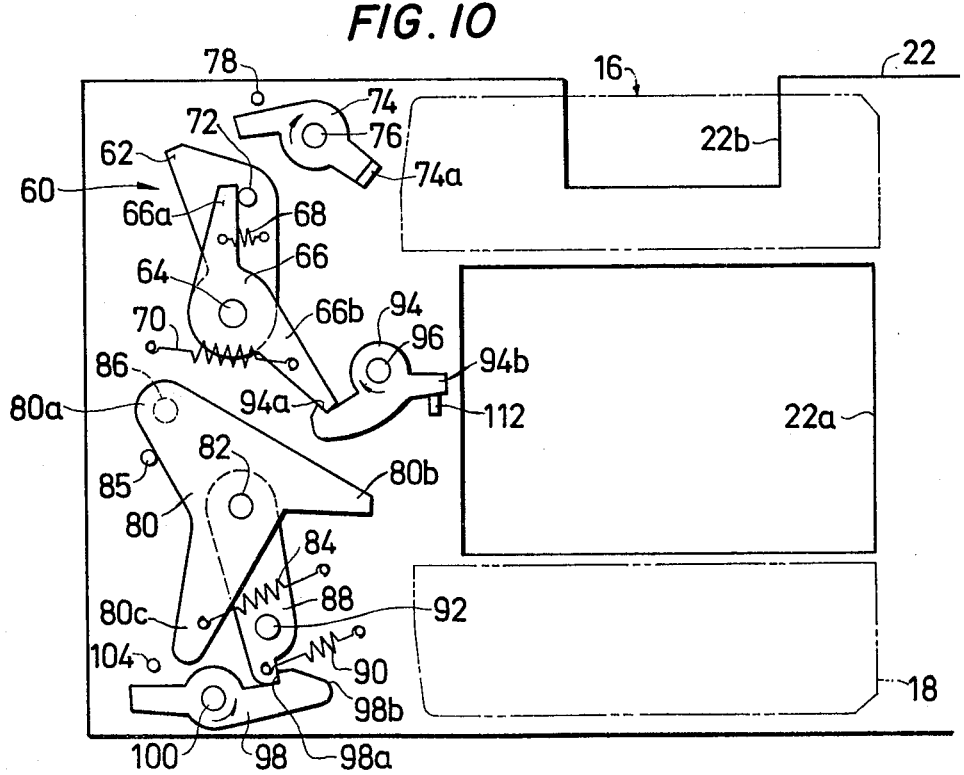
FIG. 10 shows the plan view of a shutter drive mechanism of the shutter particularly suitable for the single lens reflex camera, which is obtained by modifying the drive mechanism of the shutter shown in FIGS. 3 through 6.

In the photographic camera 10 according to the present invention, the leading-shutter blade 16 which is held in its opening position while the exposure is being performed is released from its opening position by the drive lever 88. However, such release of the leading-shutter blade 16 from its opening position may be also performed by the return movement of the reflex mirror 28. In this case, it is preferable to fix the pin 110 as shown in phantom in FIG. 1A to, for example, the set lever 45 of the conventional mirror operating mechanism 26 shown in FIG. 1A and to provide a rotatable lever 112, also shown in phantom in the same figure, to a suitable stational member of the camera 10 so that the rotatable lever 112 is moved by the rotational movement of the set lever 45. In order that the release lever 94 shown in FIGS. 3 through 6 is rotated in the counterclockwise direction by the above-mentioned rotatable lever 112 instead of the drive lever 88, the release lever 94 is changed in its shape so as to have an arm 94b with which one end of the rotatable lever 112 can engage, as shown in Fig. 10.

In this arrangement, the locking operation of the lock lever 50 to the set lever 45 may be released by the operation of the drive lever 88 through a suitable mechanism (not shown) so that the movable reflex mirror 28 will be brought into its original position (rest position.) According to the above-mentioned arrangement, the leading-shutter blade 16 which is held in its open position while the exposure is being performed can be released from its opening position by the return movement of the reflex mirror 28.

While an idea of the present invention is particularly suitable for the single lens reflex camera in which the optical field of the view finder is darkened during the period of the opening and closing operation of the shutter, it is needless to say that the idea of the present invention is applicable to another type of the photographic camera other than the single lens reflex type.

I claim:
1. A photographic camera comprising:
   a view finder optical system having a light path and a focal plane shutter provided
   at least one shutter base plate provided with an upper portion having a cutout portion through which said light path passes, a lower portion and an exposure aperture which is positioned between the upper and the lower portions of the base plate,
   a leading-shutter blade movably mounted to the base plate so that it can move between its closing position where it covers said aperture and its opening position where it opens said aperture, a trailing-shutter blade movably mounted to the base plate so that it can move between its closing position where it covers said aperture and its opening position where it opens said aperture,
   said leading-shutter blade being positioned at the upper portion of the base plate when it is moved to its opening position, with a part thereof covering at least a part of the cutout portion;
   said trailing shutter blade being positioned at the lower portion of the base plate when it is moved to its opening position and
   a shutter drive mechanism mounted on the base plate and coupled to the leading and the trailing shutter blades to operate them,
   wherein a part of the light path of the view finder optical system is interrupted by the leading shutter blade when the leading shutter blade is brought into its opening position.

2. A photographic camera comprising:
   a view finder optical system having a light path,
   a focal plane shutter provided at least one shutter base plate provided with an upper portion having a cutout portion through which said light path passes, a lower portion and an exposure aperture which is positioned between the upper and the lower portions of the base plate,
   a leading-shutter blade movably mounted to the base plate so that it can move between its closing position where it covers said aperture and its opening position where it opens said aperture, a trailing-shutter blade movably mounted to the base plate so that it can move between its closing position where it covers said aperture and its opening position where it opens said aperture,
   said leading-shutter blade being positioned at the upper portion of the base plate when it is moved to its opening position, with a part thereof covering at least a part of the cutout portion,
   said trailing shutter blade being positioned at the lower portion of the base plate when it is moved to its opening position,
   a leading-shutter blade drive mechanism in which two drive forces that are different in their operational directions are set by a shutter charging operation, and which commences the drive of the leading-shutter blade at the different time and
   a trailing-shutter blade drive mechanism which shifts the trailing-shutter blade from its closing position to its opening position by the shutter charging operation, and in which a drive force to return the trailing-shutter blade into its closing position is set by the shutter charging operation,
   a movable reflex mirror movable between an original position where it forms a part of the view finder optical system and a shifted position where it does not form a part of the view finder optical system and
   a reflex mirror operating mechanism in which two drive forces that are different in their operational directions are set by a shutter charging operation, and which commences the drive of the movable reflex mirror at the different time,
   wherein the movable reflex mirror is shifted with a shutter release operation to its shifted position by one of said drive forces of the reflex mirror operating mechanism; then the leading-shutter blade is shifted to its opening position by one of said drive forces of the leading shutter drive mechanism; and, after a time delay, the leading-shutter blade is returned to its closing position by the other of said drive forces of the leading shutter operating mechanism and the movable reflex mirror is returned to its original position by the other of said drive forces of the reflex mirror operating mechanism, in response to the trailing-shutter blade being moved to its closing position respectively.

3. A photographic camera according to claim 2 wherein
said leading-shutter blade is returned to its closing position in response to the operation of the trailing-shutter blade and then the movable reflex mirror is returned to its original position in response to the return movement of the leading-shutter blade.

4. A photographic camera according to claim 2, wherein
said movable reflex mirror is returned to its original position in response to the operation of the trailing-shutter blade and then the leading-shutter blade is returned to its closing position in response to the return movement of the movable relex mirror.

* * * * *